United States Patent
Okazaki

(10) Patent No.: US 9,078,204 B2
(45) Date of Patent: Jul. 7, 2015

(54) BASE STATION, COMMUNICATION CONTROL METHOD, AND WIRELESS COMMUNICATION SYSTEM

(75) Inventor: Yuuki Okazaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 268 days.

(21) Appl. No.: 13/425,490

(22) Filed: Mar. 21, 2012

(65) Prior Publication Data

US 2012/0295657 A1    Nov. 22, 2012

(30) Foreign Application Priority Data

May 16, 2011 (JP) ................................ 2011-109787

(51) Int. Cl.
H04W 88/08    (2009.01)
H04B 7/00     (2006.01)
H04W 56/00    (2009.01)

(52) U.S. Cl.
CPC .............. *H04W 56/00* (2013.01); *H04W 88/08* (2013.01)

(58) Field of Classification Search
CPC .............. H04W 88/08; H04W 56/005; H04W 74/08–74/0866; H04J 13/0062; H04J 13/0066
See application file for complete search history.

(56) References Cited

U.S. PATENT DOCUMENTS

| 8,081,617 | B2 | 12/2011 | Iwai et al. | |
| 8,085,724 | B2 | 12/2011 | Imamura et al. | |
| 2004/0136345 | A1 | 7/2004 | Yano et al. | |
| 2005/0047530 | A1* | 3/2005 | Lee et al. | 375/343 |
| 2007/0270143 | A1* | 11/2007 | Ishikawa | 455/435.1 |
| 2011/0116364 | A1* | 5/2011 | Zhang et al. | 370/216 |

FOREIGN PATENT DOCUMENTS

| JP | 2000-069526 | 3/2000 |
| JP | 2003-218740 | 7/2003 |
| JP | 2009-270697 | 11/2009 |
| WO | WO-2008/016112 | 2/2008 |
| WO | WO-2008/129797 | 10/2008 |

OTHER PUBLICATIONS

3GPP TS 36.211 v10.0.0 URL: http.www.3gpp.org/ftp/Specs/html-info/36-series.htm, Dec. 22, 2010.
JPOA—Japanese Office Action mailed on Sep. 9, 2014 in Japanese Patent Application No. 2011-109787, with partial English-language translation. WO2008/016112 cited in the above listed JPOA was previously submitted in the IDS filed on Mar. 21, 2012 and considered by the Examiner on Feb. 7, 2014..

* cited by examiner

*Primary Examiner* — Fanghwa Wang
(74) *Attorney, Agent, or Firm* — Fujitsu Patent Center

(57) ABSTRACT

A base station includes an obtaining unit and an instructing unit. The obtaining unit obtains, from another base station that communicates with a mobile device, a propagation delay amount between the other base station and the mobile device. When a propagation delay amount between the base station and the mobile device which is based on the propagation delay amount obtained by the obtaining unit is present within a predetermined range from a boundary of a detecting window that is used in detecting a preamble sequence transmitted from the mobile device, the instructing unit instructs the mobile device to stop the transmission of the preamble sequence corresponding to another detecting window that lies adjacent across the boundary.

7 Claims, 10 Drawing Sheets

| HO SOURCE SECTOR NUMBER | HO DESTINATION SECTOR NUMBER | CORRECTION COEFFICIENT α |
|---|---|---|
| 2 | 6 | 1.3 |
| 3 | 6 | 1.0 |
| 4 | 6 | 1.3 |

FIG.10
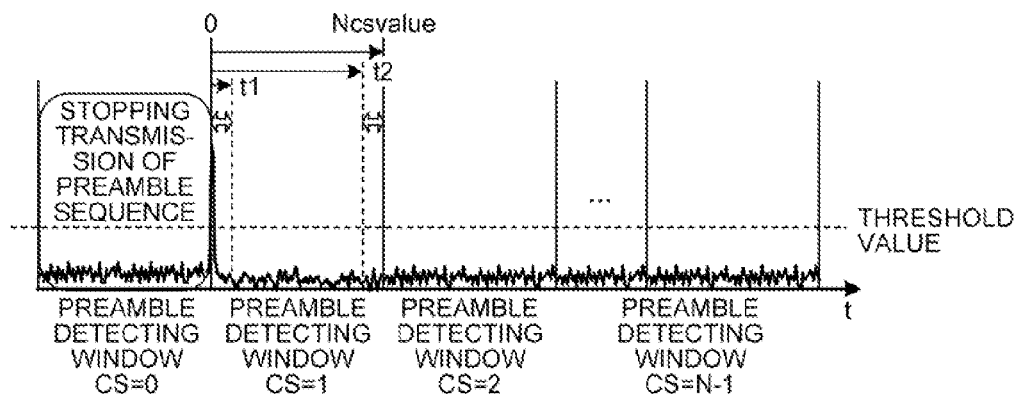
FIG.11
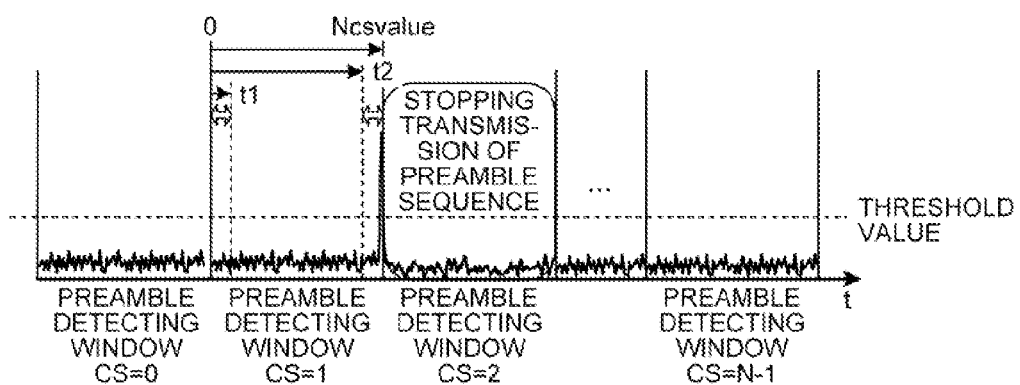
FIG.12
| 0 | 1 | 2 | 3 | 4 | 5 | ... | N-2 | N-1 |
|---|---|---|---|---|---|-----|-----|-----|
| 0 | 1 | 2 | 3 | 4 | 5 | ... | N-2 | N-1 |
| 0 | 1 | 2 | 3 | 4 | 5 | ... | N-2 | N-1 |
| 0 | 1 | 2 | 3 | 4 | 5 | ... | N-2 | N-1 |
|---|---|---|---|---|---|-----|-----|-----|

BASE STATION, COMMUNICATION CONTROL METHOD, AND WIRELESS COMMUNICATION SYSTEM

CROSS-REFERENCE TO RELATED APPLICATION

This application is based upon and claims the benefit of priority of the prior Japanese Patent Application No. 2011-109787, filed on May 16, 2011, the entire contents of which are incorporated herein by reference.

FIELD

The present embodiment discussed herein is directed to a base station, a communication control method, and a wireless communication system.

BACKGROUND

In long term evaluation (LTE), at the time of establishing uplink synchronization or at the time of performing hand over, preamble signals are transmitted using RACH, which stands for Random Access CHannel and serves as an upbound channel. Thus, a mobile device at the transmitting side transmits predetermined preamble sequences to the RACH. On the other hand, a base station at the receiving side subjects the preamble sequences, which arrive from the mobile device, and a known data series to correlation calculation so as to obtain a delay profile. Then, the base station makes use of detecting windows to compare peaks of the delay profile with a threshold value and detects whether or not the preamble signals have been transmitted.

In such a preamble detecting method, if the preamble sequences arriving from a mobile device have propagation environment factors such as noise or fading, then the preamble signals may get detected by mistake. More particularly, if the preamble sequences arriving from a mobile device have propagation environment factors such as noise or fading, the peaks of the delay profile undergo changes. Consequently, despite the fact that no preamble signal is actually transmitted by the mobile device, the base station determines that a peak of the delay profile has exceeded the predetermined threshold value at a detecting window and thus mistakenly detects that a preamble signal has been transmitted by the mobile device. In the following explanation, the condition in which a mobile device is mistakenly detected to have transmitted a preamble signal is referred to as "preamble signal false detection".

In order to avoid the condition of preamble signal false detection, a technology has been disclosed for adjusting the width of a detecting window according to the propagation delay amount between the mobile device and the base station. In such a conventional technology, the width of a detecting window is adjusted so as to reduce interference with the preamble sequence corresponding to an adjacent detecting window. That enables achieving reduction in the occurrence of preamble signal false detection.

Patent Literature 1: International Publication Pamphlet No. 2008/016112
Patent Literature 2: International Publication Pamphlet No. 2008/129797

However, in the conventional technology of adjusting the width of the detecting window, if the mobile device is located either in the vicinity of the base station or at the end portion of a cell housed in the base station, there remains a possibility that the preamble signals are detected by mistake.

That is, if the mobile device is located either in the vicinity of the base station or at the end portion of a cell, sometimes the delay profile reaches a peak near the boundary of a detecting window and the side lobe of the delay profile leaks into the adjacent detecting window. In such a case, in the conventional technology described above, at the time of establishing uplink synchronization or at the time of performing hand over; when a mobile device starts transmitting the preamble sequences, firstly the base station instructs the mobile device to transmit all preamble sequences in order starting from lower sequence numbers to higher sequence numbers. Accordingly, in the conventional technology, the mobile device transmits the preamble sequences corresponding to all detecting windows to the base station. Hence, in the other detecting window into which a side lobe of the delay profile has leaked, it is mistakenly detected that the peak of the delay profile has exceeded a predetermined threshold value. As a result, there remains a possibility that the preamble signals are detected by mistake.

SUMMARY

According to an aspect of an embodiment of the invention, a base station includes an obtaining unit that obtains, from another base station that communicates with a mobile device, a propagation delay amount between the other base station and the mobile device; and an instructing unit that, when a propagation delay amount between the base station and the mobile device which is based on the propagation delay amount obtained by the obtaining unit is present within a predetermined range from a boundary of a detecting window that is used in detecting a preamble sequence transmitted from the mobile device, instructs the mobile device to stop the transmission of the preamble sequence corresponding to another detecting window that lies adjacent across the boundary.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a diagram for explaining an instruction regarding the transmission of preamble sequences that is issued when the estimated propagation delay amount is present in the vicinity of the boundary at the beginning of a preamble detecting window;

FIG. 11 is a diagram for explaining an instruction regarding the transmission of preamble sequences that is issued when the estimated propagation delay amount is present in the vicinity of the boundary at the end of a preamble detecting window;

FIG. 12 is a diagram illustrating the transmission of preamble sequences in a case when a single UE is present that has the estimated propagation delay amount in the vicinity of the boundaries at the beginning of preamble detecting windows;

FIG. 13 is a diagram illustrating the transmission of preamble sequences in the case when two UEs are present that have the estimated propagation delay amount in the vicinity of the boundaries at the beginning of preamble detecting windows;

FIG. 14 is a diagram illustrating the transmission of preamble sequences in the case when a single UE is present that has the estimated propagation delay amount in the vicinity of the boundaries at the end of preamble detecting windows;

FIG. 15 is a diagram illustrating the transmission of preamble sequences in the case when two UEs are present that have the estimated propagation delay amount in the vicinity of the boundaries at the end of preamble detecting windows;

DESCRIPTION OF EMBODIMENT

Preferred embodiments of the present invention will be explained with reference to accompanying drawings. The present invention is not limited to this embodiment.

Figure 1:
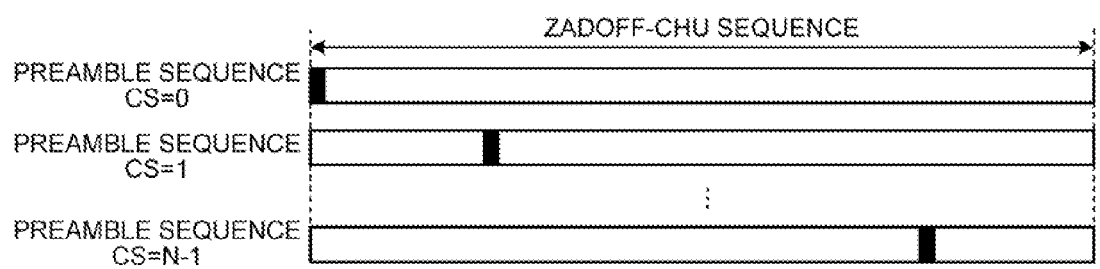
FIG. 1 is a diagram illustrating exemplary preamble sequences.

Prior to the explanation of an embodiment, firstly, the explanation is given regarding preamble sequences that are transmitted via the RACH. A mobile device at the transmitting side transmits predetermined preamble sequences to the RACH. FIG. 1 is a diagram illustrating exemplary preamble sequences. As illustrated in FIG. 1, the preamble sequences that are transmitted via the RACH are generated by performing cyclic shifting (CS) of the Zadoff-Chu sequence. Herein, as an example, the Zadoff-Chu sequence is subjected to cyclic shifting so that N number of preamble sequences (sequence number CS=0 to N−1) are generated. Meanwhile, in FIG. 1, black quadrangular shapes indicate the starting positions of the preamble sequences.

Figure 2:
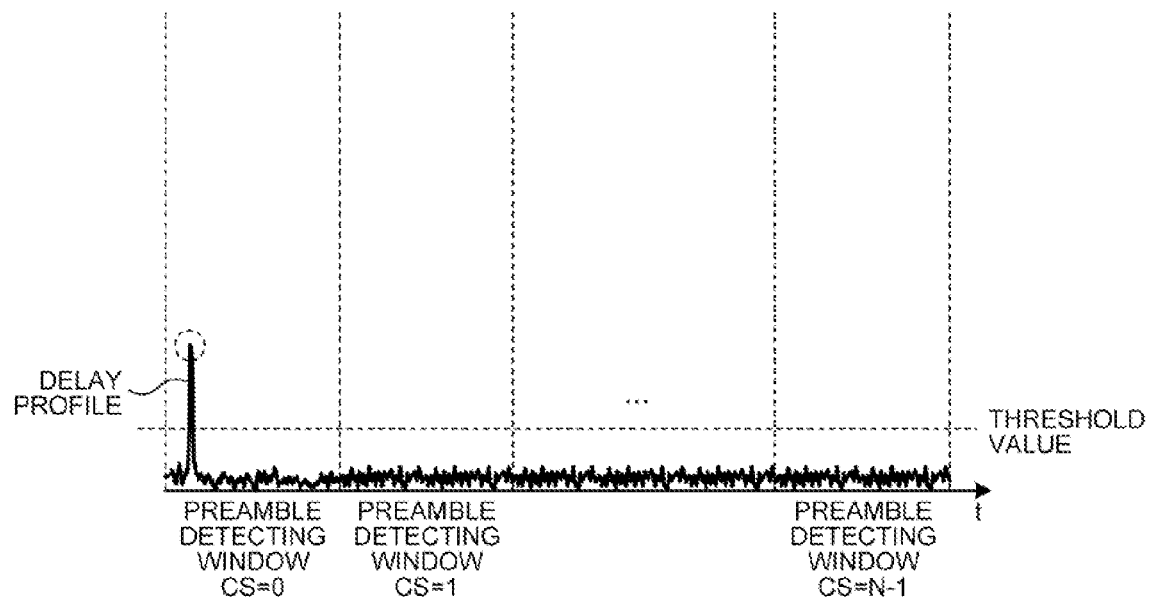
FIG. 2 is a diagram for explaining the detection of preamble sequences.

At the receiving side, a base station detects whether or not the preamble sequences have been transmitted. FIG. 2 is a diagram for explaining the detection of preamble sequences. As illustrated in FIG. 2, firstly, corresponding to the sequence numbers (CS=0 to N−1) of the preamble sequences, the base station generates preamble detecting windows that serve as monitoring sections used in the detection of the preamble sequences that are transmitted by the mobile device. Then, the base station subjects the preamble sequences, which arrive from the mobile device, and known preamble sequences to correlation calculation so as to obtain a delay profile. Then, within the preamble detecting windows, the base station compares the peaks of the obtained delay profile with a threshold value, and detects whether or not the preamble sequences have been transmitted. Herein, in the preamble detecting window corresponding to the sequence number CS=0, the peak of the delay profile is exceeding the threshold value. Hence, in the preamble detecting window corresponding to the sequence number CS=0, it is detected that a preamble sequence has been transmitted. Meanwhile, in FIG. 2, the horizontal axis represents the time and the vertical axis represents the power level.

Figure 3:
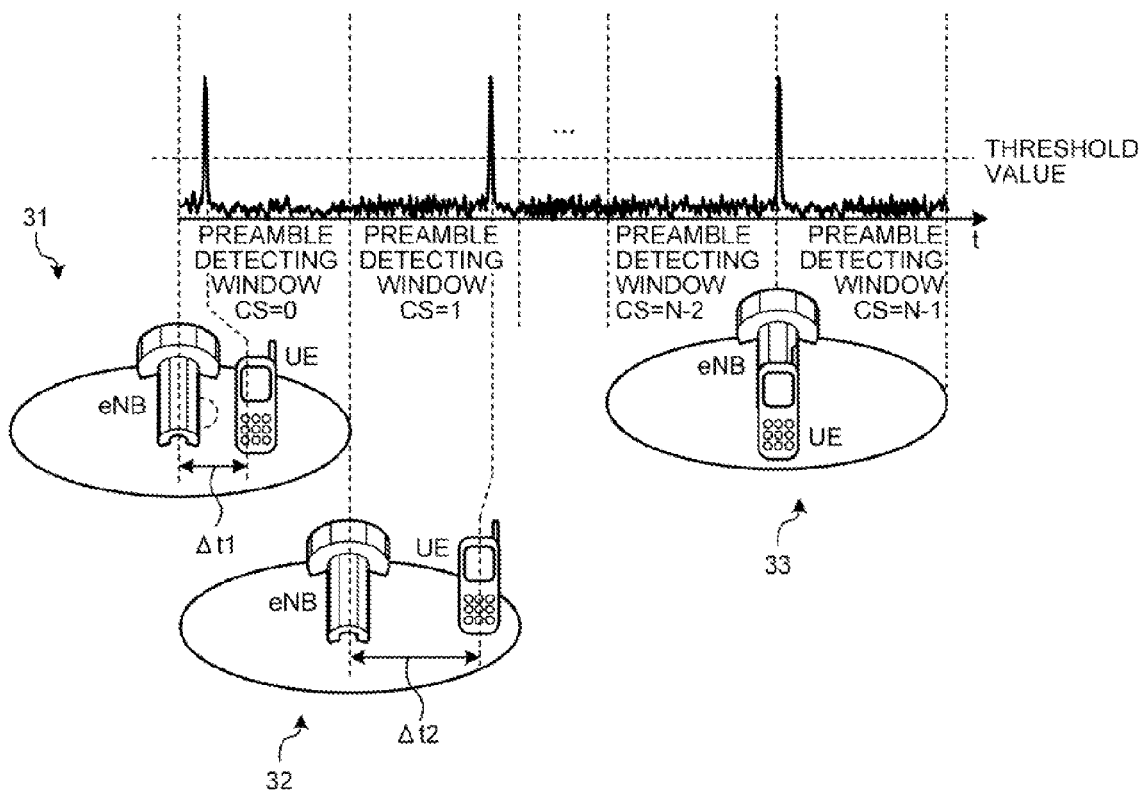
FIG. 3 is a diagram illustrating the relationship of the peak positions of a delay profile in preamble detecting windows with the propagation delay amount between a base station and a mobile device.

Given below is the explanation regarding the relationship of the peak positions of the delay profile in the preamble detecting windows with the propagation delay amount between the base station and the mobile device. FIG. 3 is a diagram illustrating the relationship of the peak positions of the delay profile in the preamble detecting windows with the propagation delay amount between the base station and the mobile device. In FIG. 3, condition 31 indicates that the base station (eNB: evolutional Node B) and the mobile device (UE: User Equipment) therebetween have a propagation delay amount of $\Delta t1$. Similarly, in FIG. 3, condition 32 indicates that the eNB and the UE herebetween have a propagation delay amount of $\Delta t2$. Herein, $\Delta t1$ is assumed to be smaller than $\Delta t2$.

As illustrated in condition 31 and condition 32 in FIG. 3, the propagation delay amount between the eNB and the UE corresponds to the peak positions of the delay profile within preamble detecting windows. Moreover, if the propagation delay amount between the eNB and the UE is present near the boundary at the beginning of a preamble detecting window, it means that the UE is located in the vicinity of the eNB. On the other hand, if the propagation delay amount between the eNB and the UE is present near the boundary at the end of the preamble detecting window, it means that the UE is located at the end portion of the cell housed in the eNB.

Particularly, when the UE is located either in the vicinity of the eNB or at the end portion of the cell housed in the eNB, the delay profile reaches the peaks near the boundaries of the preamble detecting windows. In that case, the side lobes of the delay profile leak into corresponding adjacent detecting windows. For example, in condition 33 illustrated in FIG. 3, since the propagation delay amount between the eNB and the UE is present near the boundary at the beginning of the preamble detecting window having the sequence number CS=N−1, a side lobe of the delay profile leaks into the adjacent preamble detecting window having the sequence number CS=N−2. In this way, if the side lobe of the delay profile within a particular preamble detecting window leaks into the adjacent preamble detecting window, the eNB mistakenly determines that the peak of the delay profile in the other preamble detecting window has exceeded a predetermined threshold value.

Given below is the explanation regarding the conventional method of transmitting preamble sequences, upon which is premised a preamble sequence transmitting method that is implemented in a wireless communication system including the base station according to the present embodiment.

Figure 4:
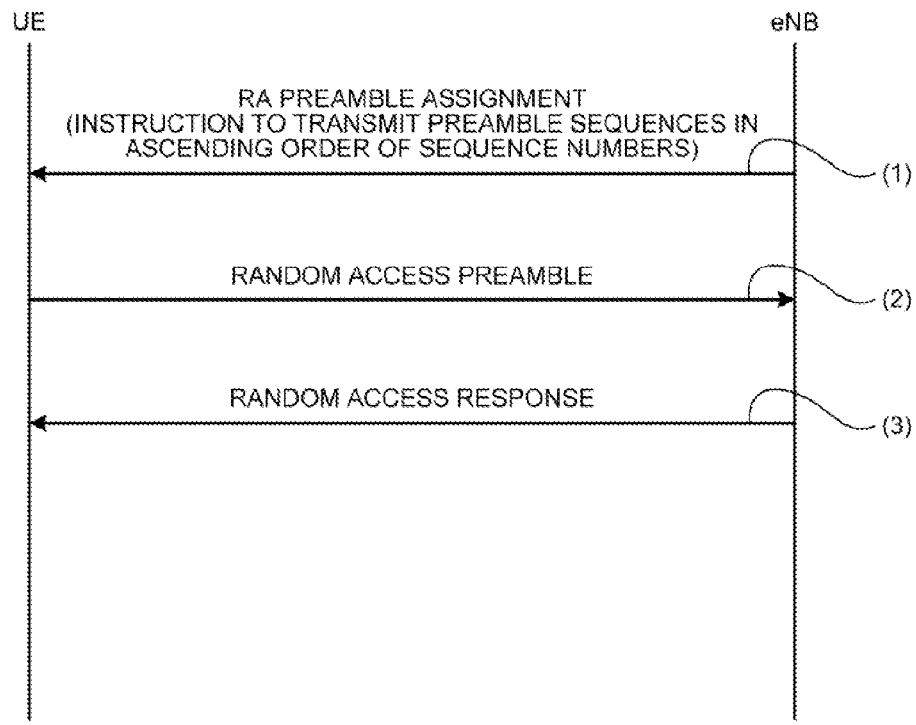
FIG. 4 is a diagram for explaining the conventional method of transmitting preamble sequences.

FIG. 4 is a diagram for explaining the conventional method of transmitting preamble sequences. In FIG. 4, it is illustrated that a mobile device (UE) that has already established communication with a base station (eNB) transmits preamble sequences at the time of performing hand over or at the time of performing resynchronization of frames.

Firstly, to the UE, the eNB transmits an RA preamble assignment signal as an instruction regarding the preamble sequences that are to be transmitted (see (1) in FIG. 4). At that time, to the UE, the eNB transmits the RA preamble assignment signal as an instruction to transmit the preamble sequences in order starting from lower sequence numbers to higher sequence numbers.

Upon receiving the RA preamble assignment signal, the UE transmits a random access preamble signal to the eNB (see (2) in FIG. 4). At that time, to the eNB, the UE transmits the preamble sequences in order starting from lower sequence numbers to higher sequence numbers as the random access preamble signal.

Upon receiving the random access preamble signal, the eNB replies to the UE with a random access response signal (see (3) in FIG. 4). For example, to the UE, the eNB transmits a reply in the form of a random access response signal that contains information such as the sequence numbers of the preamble sequences detected at that eNB.

Explained below are the problems in the method of transmitting preamble sequences explained with reference to FIG. 4. In the example illustrated in FIG. 4, when UEs start transmitting the preamble sequences, firstly, the eNB performs allocation in order starting from lower sequence numbers to higher sequence numbers and instructs the UEs to transmit all preamble sequences. As a result, the preamble sequences that correspond to all preamble detecting windows generated in the eNB are transmitted to the eNB from each UE. Thus, in a preamble detecting window into which a side lobe of the delay profile has leaked from the adjacent preamble detecting window, there is a possibility that the peak of the delay profile is mistakenly detected to have exceeded a predetermined threshold value. That may result in false detection of the preamble signals.

For example, as illustrated in condition 33 in FIG. 3, the side lobe of the delay profile in the preamble detecting window having the sequence number CS=N−1 leaks into the preamble detecting window having the sequence number CS=N−2. For that reason, in the preamble detecting window having the sequence number CS=N−2, the peak of the delay profile is mistakenly determined to have exceeded a predetermined threshold value. As a result, the preamble signals are detected by mistake.

In that regard, in the present embodiment, the instruction for transmitting preamble sequences that is issued to the UEs is modified with the aim of avoiding the problem of false detection of preamble signals occurring in the conventional method of transmitting preamble sequences.

Figure 5:
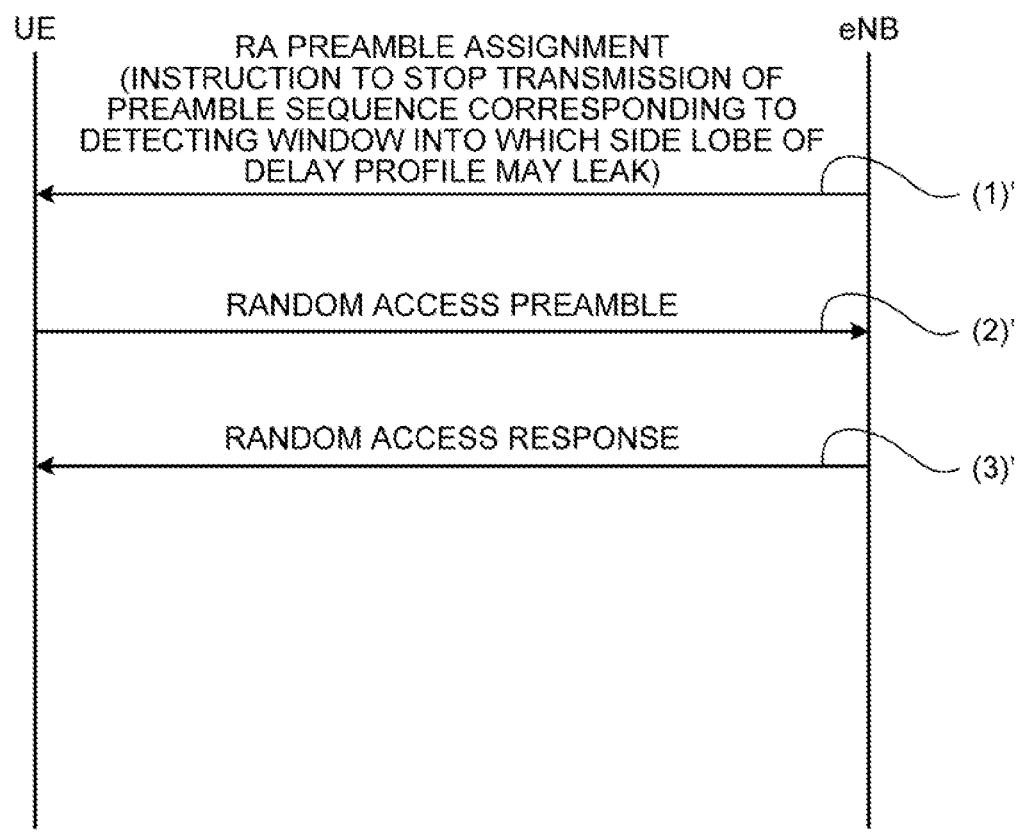
FIG. 5 is a diagram for explaining a method of transmitting preamble sequences according to an embodiment of the present invention.

Explained below is the method of transmitting preamble sequences according to the present embodiment. FIG. 5 is a diagram for explaining the method of transmitting preamble sequences according to the present embodiment. In FIG. 5, it is illustrated that a mobile device (UE) that has already established communication with a base station (eNB) transmits preamble sequences at the time of performing hand over or at the time of performing resynchronization of frames.

Firstly, to the UE, the eNB transmits an RA preamble assignment signal as an instruction regarding the preamble sequences to be transmitted (see (1)' in FIG. 5). At that time, to the UE, the eNB transmits the RA preamble assignment signal as an instruction to stop the transmission of a preamble sequence that corresponds to such a preamble detecting window into which a side lobe of the delay profile may leak. Herein, a preamble detecting window into which the side lobe of the delay profile may leak points to, for example, the preamble detecting window having the sequence number CS=N−2 illustrated in condition 33 in FIG. 3.

Upon receiving the RA preamble assignment signal, the UE transmits a random access preamble signal to the eNB (see (2)' in FIG. 2). At that time, the UE stops the transmission of the preamble sequence corresponding to such a preamble detecting window into which a side lobe of the delay profile may leak, but transmits the remaining preamble sequences as the random access preamble signal to the eNB. For example, the UE stops transmitting the preamble sequence corresponding to the preamble detecting window having the sequence number CS=N−2 illustrated in condition 33 in FIG. 3, but transmits the preamble sequences having the sequence numbers CS=1 to CS=N−3 and the preamble sequence having the sequence number CS=N−1 as the random access preamble signal to the eNB.

Upon receiving the random access preamble signal, the eNB replies to the UE in the form of a random access response signal (see (3)' in FIG. 5).

In this way, in the present embodiment, when a UE starts transmitting preamble sequences, firstly, the eNB instructs the UE to stop the transmission of the preamble sequence corresponding to such a preamble detecting window into which a side lobe of the delay profile may leak. With that, the eNB avoids a situation of detecting a preamble sequence using a preamble detecting window into which a side lobe of the delay profile has leaked. As a result, false detection of the preamble signals is avoided.

Figure 6:
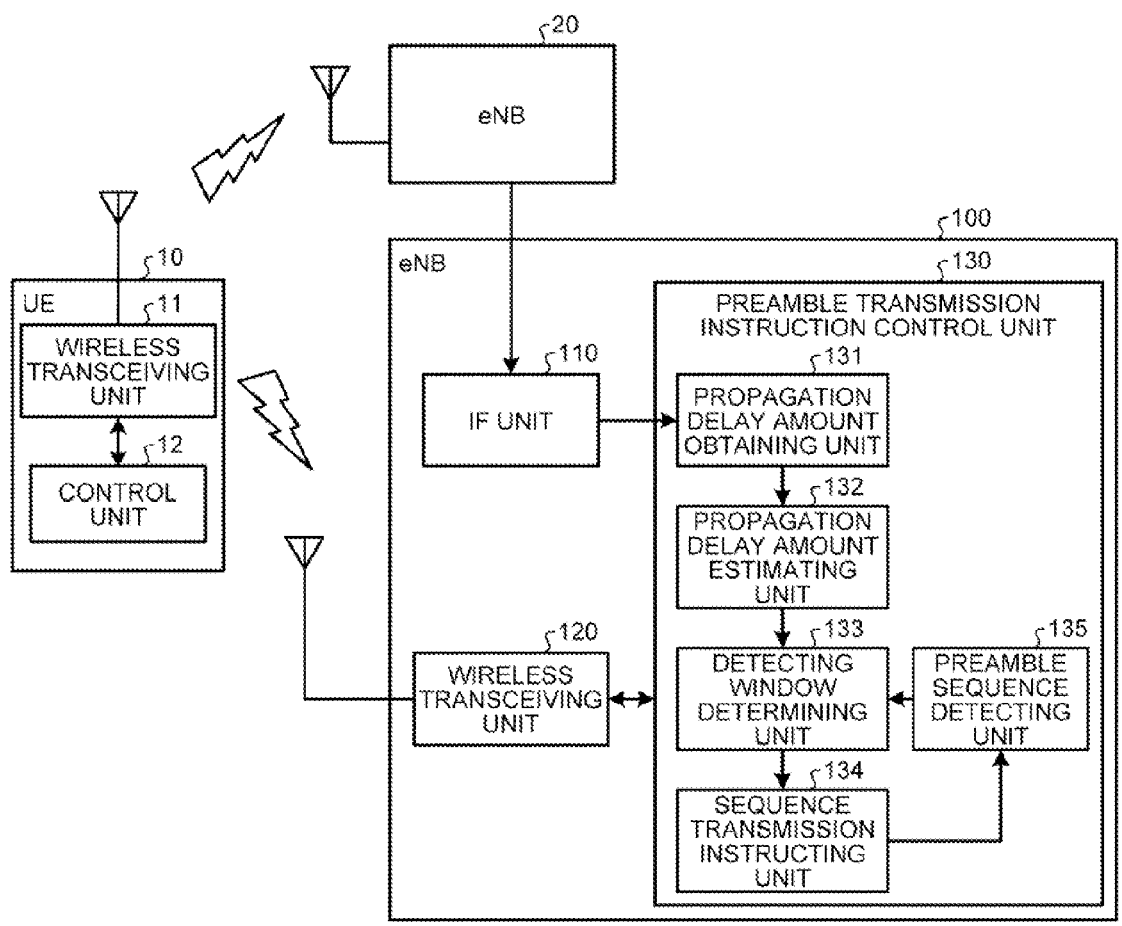
FIG. 6 is a diagram illustrating a configuration example of a wireless communication system including a base station according to the present embodiment.

Explained below is an exemplary configuration of the wireless communication system including the base station according to the present embodiment. FIG. 6 is a diagram illustrating a configuration example of the wireless communication system including the base station according to the present embodiment. As illustrated in FIG. 6, the wireless communication system includes a mobile device (UE) 10, a base station (eNB) 20, and a base station (eNB) 100.

The UE 10 is a portable wireless communication device such as a cellular phone unit. The UE 10 includes a wireless transceiving unit 11 and a control unit 12. The wireless transceiving unit 11 can be implemented using an analog circuit, while the control unit 12 can be implemented with a processor such as a central processing unit (CPU).

The wireless transceiving unit 11 communicates a variety of information with the eNB 20 (described later) that serves as a hand over (HO) source eNB. Moreover, the wireless transceiving unit 11 transmits the abovementioned preamble sequences to the eNB 100 that serves as a HO destination NB. Besides, from the eNB 100, the wireless transceiving unit 11 receives an instruction (described later) for stopping the transmission of preamble sequences.

Based on the instruction for stopping the transmission of preamble sequences that is received by the wireless transceiving unit 11, the control unit 12 performs control to regulate (stop) the transmission of preamble sequences to the eNB 100.

The eNB 20 as well as the eNB 100 is a base station that houses a cell serving as a wireless communication area and that provides a wireless link to the UE 10, which is positioned within the corresponding cell, for the purpose of communication with the UE 10. Herein, it is assumed that the eNB 20 has already provided a wireless link to the UE 10 and is communicating with the UE 10. On the other hand, it is assumed that the eNB 100 has not yet provided a wireless link to the UE 10 and is not communicating with the UE 10. In the following explanation, the eNB 20 that is communicating with the UE 10 is sometimes referred to as "HO source eNB" and the eNB 100 that is not communicating with the UE 10 is sometimes referred to as "HO destination eNB". The eNB 100 serving as the HO destination eNB corresponds to the base station according to the present embodiment.

The eNB 100 includes an interface (IF) unit 110, a wireless transceiving unit 120, and a preamble transmission instruction control unit 130. The IF unit 110 communicates a variety of information with the eNB 20 serving as the HO source eNB. The wireless transceiving unit 120 communicates a variety of information with the UE 10. Moreover, to mobile devices, the wireless transceiving unit 120 transmits a signal as an instruction to stop the transmission of preamble sequences as described later.

The preamble transmission instruction control unit 130 controls instructions issued to the UE 10 regarding the transmission of preamble sequences. Herein, the preamble transmission instruction control unit 130 includes a propagation delay amount obtaining unit 131, a propagation delay amount estimating unit 132, a detecting window determining unit 133, a sequence transmission instructing unit 134, and a preamble sequence detecting unit 135.

The propagation delay amount obtaining unit 131 obtains an HO source propagation delay amount, which points to the propagation delay amount between the eNB 20 serving as the HO source eNB and the UE 10. For example, when the eNB 20 holds a GPS value (GPS stands for Global Positioning System) indicating the location of the UE 10, the propagation delay amount obtaining unit 131 obtains the GPS value as the HO source propagation delay amount. Moreover, when the eNB 20 holds a delay value indicating the delay period of a signal transmitted from the UE 10, the propagation delay amount obtaining unit 131 obtains the delay value as the HO source propagation delay amount. Meanwhile, the propagation delay amount obtaining unit 131 is only an example of an obtaining unit.

Based on the HO source propagation delay amount obtained by the propagation delay amount obtaining unit 131, the propagation delay amount estimating unit 132 estimates an HO destination propagation delay amount that points to the propagation delay amount between the eNB 100 serving as the HO destination eNB and the UE 10. Herein, the propagation delay amount estimating unit 132 is only an example of an estimating unit.

For example, when the GPS value of the UE 10 happens to be the HO source propagation delay amount, the propagation delay amount estimating unit 132 refers to the GPS value of the UE 10 and to the GPS value of the eNB 100, and accordingly calculates the distance between the UE 10 and the eNB 100. Then, the propagation delay amount estimating unit 132 divides the calculated distance by the speed of light and estimates the HO destination propagation delay amount.

Figure 7:
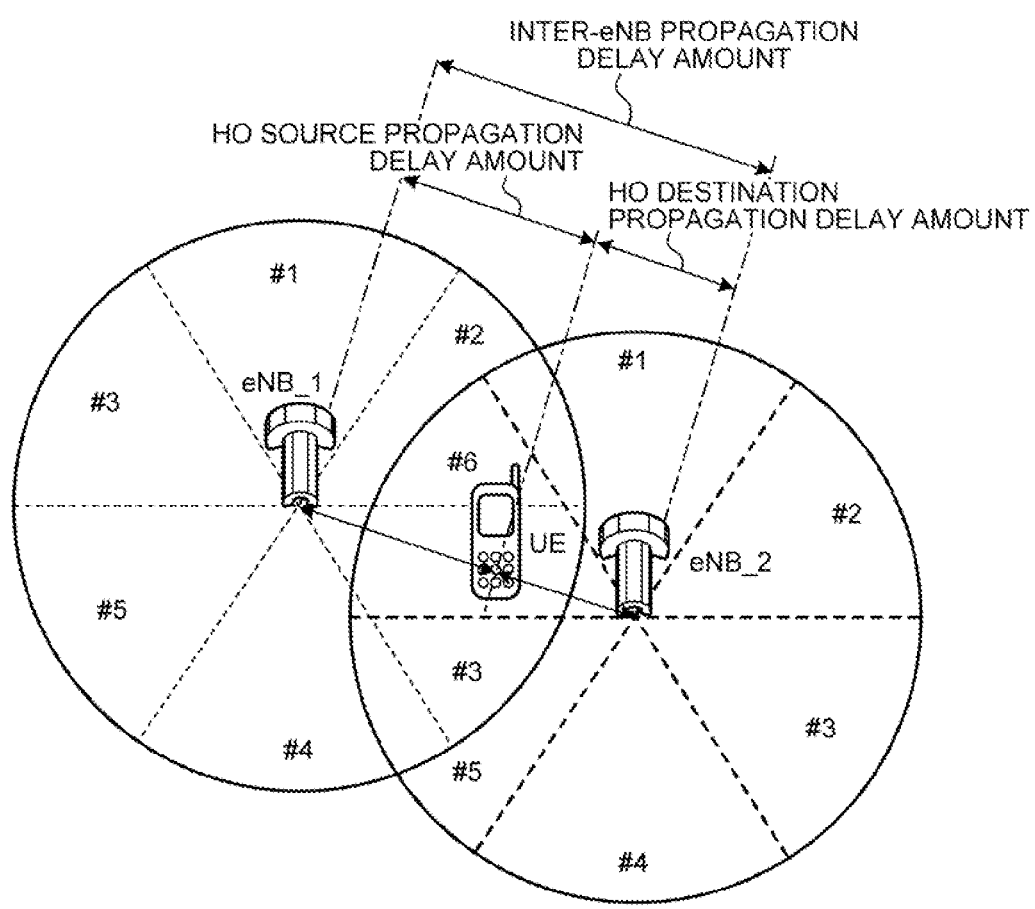
FIG. 7 is a diagram (first) for explaining an example of operations performed by a propagation delay amount estimating unit according to the present embodiment.

Alternatively, when the delay value happens to be the HO source propagation delay amount, the propagation delay amount estimating unit 132 estimates the HO source propagation delay amount in a manner illustrated in FIG. 7. That is, the propagation delay amount estimating unit 132 estimates the HO source propagation delay amount by using a formula (HO destination propagation amount delay)=(inter-eNB propagation delay amount)−(HO source propagation delay amount). Herein, the inter-eNB propagation delay amount is the period of time obtained by dividing the distance between the HO source eNB and the HO destination eNB with the speed of light, and is stored in advance in an internal memory. FIG. 7 is a diagram (first) for explaining an example of operations performed by the propagation delay amount estimating unit 132. In FIG. 7, "eNB_1" corresponds to the eNB 20 serving as the HO source eNB; "eNB_2" corresponds to the eNB 100 serving as the HO destination eNB; and "UE" corresponds to the UE 10.

Figures 8, 9:
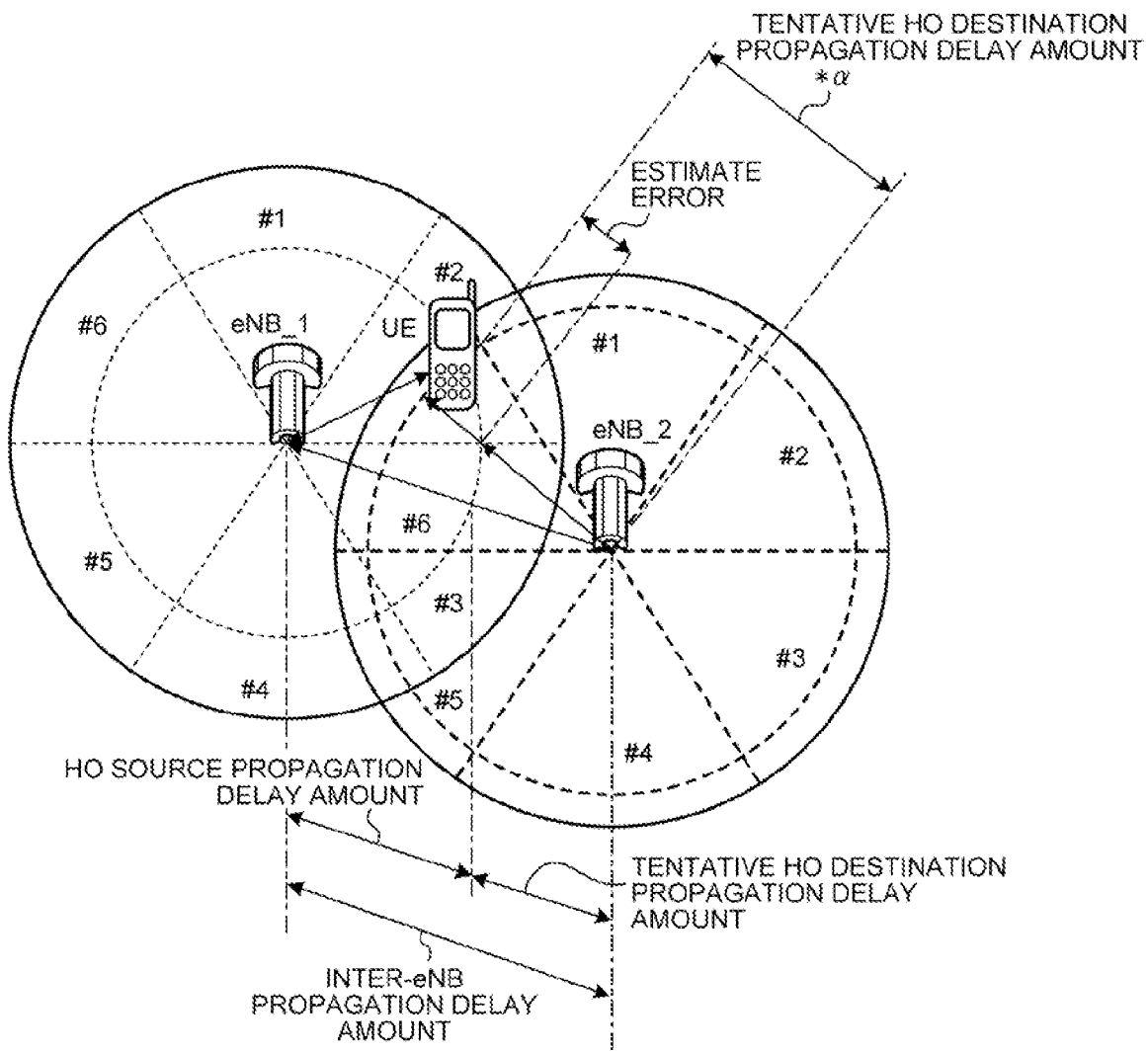
FIG. 8 is a diagram (second) for explaining an example of operations performed by the propagation delay amount estimating unit according to the present embodiment.
FIG. 9 is a diagram illustrating an exemplary correction coefficient table.

When a UE is present in the vicinity of the straight line connecting an HO source eNB and an HO destination eNB, it can be said that the HO destination propagation delay amount estimated according to the method illustrated in FIG. 7 is relatively accurate. However, as illustrated in FIG. 8, when a UE is distantly-positioned from the straight line connecting an HO source eNB and an HO destination eNB, the HO destination propagation delay amount estimated according to the method illustrated in FIG. 7 and the actual HO destination propagation delay amount happen to have an estimate error. Regarding such a case, a specific example of the operations performed by the propagation delay amount estimating unit 132 is explained below with reference to FIG. 8.

FIG. 8 is a diagram (second) for explaining an example of operations performed by the propagation delay amount estimating unit 132. In FIG. 8, "eNB_1" corresponds to the eNB 20 serving as the HO source eNB; "eNB_2" corresponds to the eNB 100 serving as the HO destination eNB; and "UE" corresponds to the UE 10. Firstly, the propagation delay amount estimating unit 132 calculates a tentative HO source propagation delay amount using a formula (tentative HO destination propagation amount delay)=(inter-eNB propagation delay amount)−(HO source propagation delay amount). Then, the propagation delay amount estimating unit 132 multiplies a correction coefficient α, which is read from a correction coefficient table stored in an internal memory, to the tentative HO destination propagation delay amount and accordingly estimates the HO destination propagation delay amount. Herein, in the correction coefficient table are stored correction coefficients that are set in advance corresponding to overlapping sectors between the eNB 100 and the eNB 20. A sector points to an area formed by arbitrarily dividing the cell housed in an eNB.

FIG. 9 is a diagram illustrating an exemplary correction coefficient table. In the correction coefficient table illustrated in FIG. 9, HO source sector numbers, HO destination sector numbers, and correction coefficients α are stored in a corresponding manner. An HO source sector number is an identification number for identifying a sector in the eNB 20 serving as the HO source eNB. Similarly, an HO destination sector number is an identification number for identifying a sector in the eNB 100 serving as the HO destination eNB. A character coefficient α points to a character coefficient used in correcting a tentative HO destination propagation delay amount. For example, as illustrated in the first row in FIG. 9, when the UE 10 is located in sector number "2" in the eNB 20 and in sector number "6" in the eNB 100, the character coefficient α equal to "1.3" is multiplied to the tentative HO destination propagation delay amount. Similarly, as illustrated in the second row in FIG. 9, when the UE 10 is located in sector number "3" in the eNB 20 and in sector number "6" in the eNB 100, the character coefficient α equal to "1.0" is multiplied to the tentative HO destination propagation delay amount. Moreover, as illustrated in the third row in FIG. 9, when the UE 10 is located in sector number "4" in the eNB 20 and in sector number "6" in the eNB 100, the character coefficient α equal to "1.3" is multiplied to the tentative HO destination propagation delay amount.

Returning to the explanation with reference to FIG. 3, the detecting window determining unit 133 obtains the HO destination propagation delay amount estimated by the propagation delay amount estimating unit 132 (hereinafter, referred to as "estimated propagation delay amount"). Then, the detecting window determining unit 133 determines whether or not the estimated propagation delay amount is present within a predetermined range from the boundary of a preamble detecting window used by the preamble sequence detecting unit 135. Meanwhile, the detecting window determining unit 133 is only an example of a determining unit.

More particularly, the detecting window determining unit 133 determines whether or not the estimated propagation delay amount is present within a predetermined range from the boundary at the beginning of a preamble detecting window. If the estimated propagation delay amount is present within a predetermined range from the boundary at the beginning of a preamble detecting window, it means that the UE 10 is located in the vicinity of the eNB 100. When the UE 10 is located in the vicinity of the eNB 100, it is highly likely that a side lobe of the delay profile leaks into the adjacent preamble detecting window via the boundary at the beginning.

On the other hand, if the estimated propagation delay amount is not present within a predetermined range from the boundary at the beginning of a preamble detecting window, the detecting window determining unit 133 determines whether or not the estimated propagation delay amount is present within a predetermined range from the boundary at the end of the preamble detecting window. If the estimated propagation delay amount is present within a predetermined range from the boundary at the end of the preamble detecting window, it means that the UE 10 is located at the end portion of the cell housed in the eNB 100. When the UE 10 is located at the end portion of the cell housed in the eNB 100, it is highly likely that the side lobe of the delay profile leaks into the adjacent preamble detecting window via the boundary at the end.

Explained below is a specific example of the operations performed by the detecting window determining unit 133. On the time axis, it is assumed that the boundary at the beginning of a preamble detecting window is "0" and the boundary at the end of a preamble detecting window is "Ncsvalue". When the estimated propagation delay amount is present in the range between "0" to "t1" on the time axis, the detecting window determining unit 133 determines that the estimated propagation delay amount is present in the vicinity of the boundary at the beginning of a preamble detecting window. In contrast, when the estimated propagation delay amount is present in the range between "t2(>t1)" to "Ncsvalue" on the time axis, the detecting window determining unit 133 determines that the estimated propagation delay amount is present in the vicinity of the boundary at the end of a preamble detecting window.

When the detecting window determining unit 133 determines that the estimated propagation delay amount is present within the predetermined range from the boundary of a preamble detecting window, the sequence transmission instructing unit 134 instructs the UE 10 to stop the transmission of the preamble sequence corresponding to an adjacent preamble detecting window. More particularly, when the detecting window determining unit 133 determines that the estimated propagation delay amount is present within a predetermined range from the boundary at the beginning of a preamble detecting window, the sequence transmission instructing unit 134 instructs the UE 10 to stop the transmission of the preamble sequence corresponding to the preamble detecting window which lies adjacent across the boundary at the beginning of the preamble detecting window under consideration. In contrast, when the detecting window determining unit 133 determines that the estimated propagation delay amount is present within a predetermined range from the boundary at the end of a preamble detecting window, the sequence transmission instructing unit 134 instructs the UE 10 to stop the transmission of the preamble sequence corresponding to the preamble detecting window which lies adjacent across the boundary at the end of the preamble detecting window under consideration. Meanwhile, the sequence transmission instructing unit 134 is only an example of an instructing unit.

As the specific operation of issuing an instruction to the mobile device to stop the transmission of a preamble sequence, the eNB 100 transmits to the UE 10 a signal representing an instruction to stop the transmission of a preamble sequence. As a specific example, the sequence transmission instructing unit 134 performs control to include the information regarding the abovementioned instruction in the RA preamble assignment signal that is transmitted to the mobile device. In that case, the wireless transceiving unit 120 transmits to the mobile device the RA preamble assignment signal including the information regarding that instruction.

Explained below with reference to FIGS. 10 and 11 is a specific example of an instruction issued by the sequence transmission instructing unit 134 regarding the transmission of preamble sequences. FIG. 10 is a diagram for explaining an instruction regarding the transmission of preamble sequences that is issued when the estimated propagation delay amount is present in the vicinity of the boundary at the beginning of a preamble detecting window. FIG. 11 is a diagram for explaining an instruction regarding the transmission of preamble sequences that is issued when the estimated propagation delay amount is present in the vicinity of the boundary at the end of a preamble detecting window. In FIGS. 10 and 11, the horizontal axis represents the time and the vertical axis represents the power level. On the time axis, it is assumed that the boundary at the beginning of a preamble detecting window is "0" and the boundary at the end of a preamble detecting window is "Ncsvalue".

As illustrated in FIG. 10, the estimated propagation delay amount is present in the range from "0" to "t1" in the preamble detecting window having the sequence number CS=1. Consequently, the sequence transmission instructing unit 134 instructs the UE 10 to stop the transmission of the preamble sequence corresponding to the preamble detecting window having the sequence number CS=0 lying adjacent across the boundary "0" at the beginning of the preamble detecting window CS=1. As a result, in case a side lobe of the delay profile leaks into the preamble detecting window having the sequence number CS=0, it becomes possible for the preamble sequence detecting unit 135 to avoid detection of the preamble sequence using the preamble detecting window having the sequence number CS=0.

Meanwhile, as illustrated in FIG. 11, the estimated propagation delay amount is present in the range from "t2(>t1)" to "Ncsvalue" in the preamble detecting window having the sequence number CS=1. Consequently, the sequence transmission instructing unit 134 instructs the UE 10 to stop the transmission of the preamble sequence corresponding to the preamble detecting window having the sequence number CS=2 lying adjacent across the boundary "Ncsvalue" at the end of the preamble detecting window CS=1. As a result, in case a side lobe of the delay profile leaks into the preamble detecting window having the sequence number CS=2, it becomes possible for the preamble sequence detecting unit 135 to avoid detection of the preamble sequence using the preamble detecting window having the sequence number CS=2.

Along with issuing an instruction to the UE 10 to stop the transmission of the preamble sequence corresponding to an adjacent preamble detecting window, the sequence transmission instructing unit 134 also instructs the preamble sequence detecting unit 135 to stop the detection of a preamble sequence using that adjacent preamble detecting window.

Herein, the preamble sequence detecting unit 135 detects whether or not the preamble sequences have been transmitted. More particularly, firstly, the preamble sequence detecting unit 135 generates preamble detecting windows corresponding to the sequence numbers (CS=0 to N~1) of the preamble sequences. Then, the preamble sequence detecting unit 135 subjects the preamble sequences, which arrive from the UE 10, and known preamble sequences to correlation calculation so as to obtain a delay profile. Subsequently, within the preamble detecting windows, the preamble sequence detecting unit 135 compares the peaks of the obtained delay profile with a threshold value and detects whether or not the preamble sequences have been transmitted. At that time, the preamble sequence detecting unit 135 stops the detection of that preamble sequence which is detected using the preamble detecting window notified by the sequence transmission instructing unit 134. Herein, the preamble sequence detecting unit 135 is only an example of a detecting unit.

The propagation delay amount obtaining unit 131, the propagation delay amount estimating unit 132, as well as the detecting window determining unit 133 can be configured with, for example, an integrated circuit such as an application specific integrated circuit (ASIC) or a field programmable gate array (FPGA). Similarly, the sequence transmission instructing unit 134 and the preamble sequence detecting unit 135 can be configured with, for example, an integrated circuit such as an ASIC or an FPGA. Alternatively, the propagation delay amount obtaining unit 131, the propagation delay amount estimating unit 132, as well as the detecting window determining unit 133 can be configured with, for example, an electronic circuit such as a CPU or a micro processing unit (MPU). Similarly, the sequence transmission instructing unit 134 and the preamble sequence detecting unit 135 can be configured with, for example, an electronic circuit such as a CPU or an MPU.

Explained below with reference to FIGS. 12 to 15 is the manner in which the UE 10 transmits preamble sequences upon receiving a transmission instruction from the sequence transmission instructing unit 134.

FIG. 12 is a diagram illustrating the transmission of preamble sequences in the case when a single UE 10 is present that has the estimated propagation delay amount in the vicinity of the boundaries at the beginning of preamble detecting windows. In FIG. 12, grey quadrangular shapes indicate that the estimated propagation delay amount is present in the vicinity of the boundaries at the beginning of preamble detecting windows. Moreover, in FIG. 12, black quadrangular shapes indicate that the UE 10 has stopped the transmission of the preamble sequences. Furthermore, in FIG. 12, white quadrangular shapes indicate that the UE 10 has transmitted the preamble sequences. Herein, the numbers specified inside the quadrangular shapes indicate the sequence numbers of the preamble sequences.

As is clear from FIG. 12, when the estimated propagation delay amount is present in the vicinity of the boundary at the beginning of a preamble detecting window, the UE 10 stops transmitting the preamble sequence corresponding to the preamble detecting window having the previous sequence number. Apart from that, the UE 10 transmits the preamble sequences corresponding to the preamble detecting windows having other preamble sequences.

Figures 13, 14, 15:
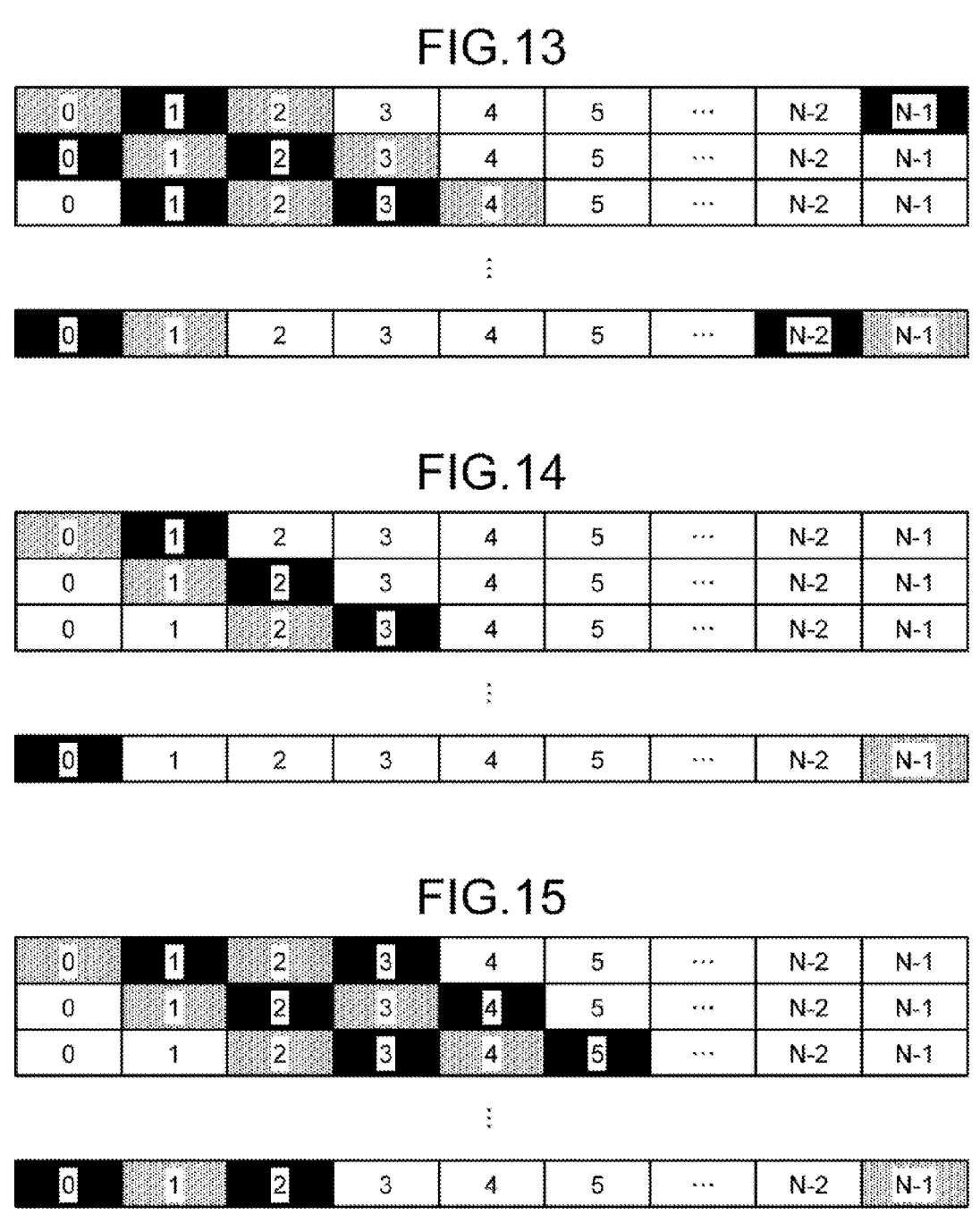

FIG. 13 is a diagram illustrating the transmission of preamble sequences in the case when two UEs 10 are present that have the estimated propagation delay amount in the vicinity of the boundaries at the beginning of preamble detecting windows. In FIG. 13, grey quadrangular shapes indicate that the estimated propagation delay amount is present in the vicinity of the boundaries at the beginning of preamble detecting windows. Moreover, in FIG. 13, black quadrangular shapes indicate that the corresponding UE 10 has stopped the transmission of the preamble sequences. Furthermore, in FIG. 13, white quadrangular shapes indicate that the corresponding UE 10 has transmitted the preamble sequences. Herein, the numbers specified inside the quadrangular shapes indicate the sequence numbers of the preamble sequences.

As is clear from FIG. 13, when the estimated propagation delay amount is present in the vicinity of the boundary at the beginning of a preamble detecting window, each of the two UEs 10 stops transmitting the preamble sequence corresponding to the preamble detecting window having the previous sequence number. Apart from that, each of the two UEs 10 transmits the preamble sequences corresponding to the preamble detecting windows having other preamble sequences.

FIG. 14 is a diagram illustrating the transmission of preamble sequences in the case when a single UE 10 is present that has the estimated propagation delay amount in the vicinity of the boundaries at the end of preamble detecting windows. In FIG. 14, grey quadrangular shapes indicate that the estimated propagation delay amount is present in the vicinity of the boundaries at the end of preamble detecting windows. Moreover, in FIG. 14, black quadrangular shapes indicate that the UE 10 has stopped the transmission of the preamble sequences. Furthermore, in FIG. 14, white quadrangular shapes indicate that the UE 10 has transmitted the preamble sequences. Herein, the numbers specified inside the quadrangular shapes indicate the sequence numbers of the preamble sequences.

As is clear from FIG. 14, when the estimated propagation delay amount is present in the vicinity of the boundary at the end of a preamble detecting window, the UE 10 stops transmitting the preamble sequence corresponding to the preamble detecting window having the subsequent sequence number. Apart from that, the UE 10 transmits the preamble sequences corresponding to the preamble detecting windows having other preamble sequences.

FIG. 15 is a diagram illustrating the transmission of preamble sequences in the case when two UEs 10 are present that have the estimated propagation delay amount in the vicinity of the boundaries at the end of preamble detecting windows. In FIG. 15, grey quadrangular shapes indicate that the estimated propagation delay amount is present in the vicinity of the boundaries at the end of preamble detecting windows. Moreover, in FIG. 15, black quadrangular shapes indicate that the corresponding UE 10 has stopped the transmission of the preamble sequences. Furthermore, in FIG. 15, white quadrangular shapes indicate that the corresponding UE 10 has transmitted the preamble sequences. Herein, the numbers specified inside the quadrangular shapes indicate the sequence numbers of the preamble sequences.

As is clear from FIG. 15, when the estimated propagation delay amount is present in the vicinity of the boundary at the end of a preamble detecting window, each of the two UEs 10 stops transmitting the preamble sequence corresponding to the preamble detecting window having the subsequent sequence number. Apart from that, each of the two UEs 10 transmits the preamble sequences corresponding to the preamble detecting windows having other preamble sequences.

Figure 16:
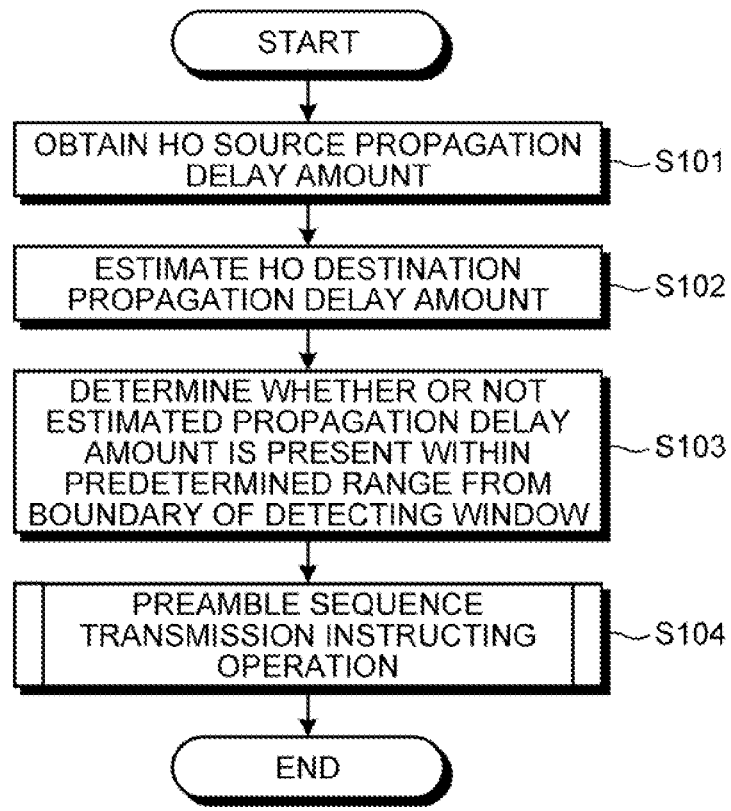
FIG. 16 is a flowchart for explaining the sequence of operations performed by the base station according to the present embodiment.

Explained below is the sequence of operations performed in the base station according to the present embodiment. FIG. 16 is a flowchart for explaining the sequence of operations performed by the base station according to the present embodiment. As illustrated in FIG. 16, the propagation delay amount obtaining unit 131 of the eNB 100 obtains an HO source propagation delay amount from the eNB 20 serving as the HO source eNB (Step S101). Then, based on the HO source propagation delay amount obtained by the propagation delay amount obtaining unit 131, the propagation delay amount estimating unit 132 estimates an HO destination propagation delay amount (Step S102).

Subsequently, the detecting window determining unit 133 determines whether or not the estimated propagation delay amount is present within a predetermined range from the boundary of a preamble detecting window (Step S103). More particularly, the detecting window determining unit 133 determines whether or not the estimated propagation delay amount is present within a predetermined range from the boundary at the beginning of a preamble detecting window. If the estimated propagation delay amount is not present within a predetermined range from the boundary at the beginning of the preamble detecting window, the detecting window determining unit 133 determines whether or not the estimated propagation delay amount is present within a predetermined range from the boundary at the end of the preamble detecting window.

Subsequently, the sequence transmission instructing unit 134 performs a preamble sequence transmission instructing operation (Step S104). The sequence of operations during the preamble sequence transmission instructing operation is explained below.

Figure 17:
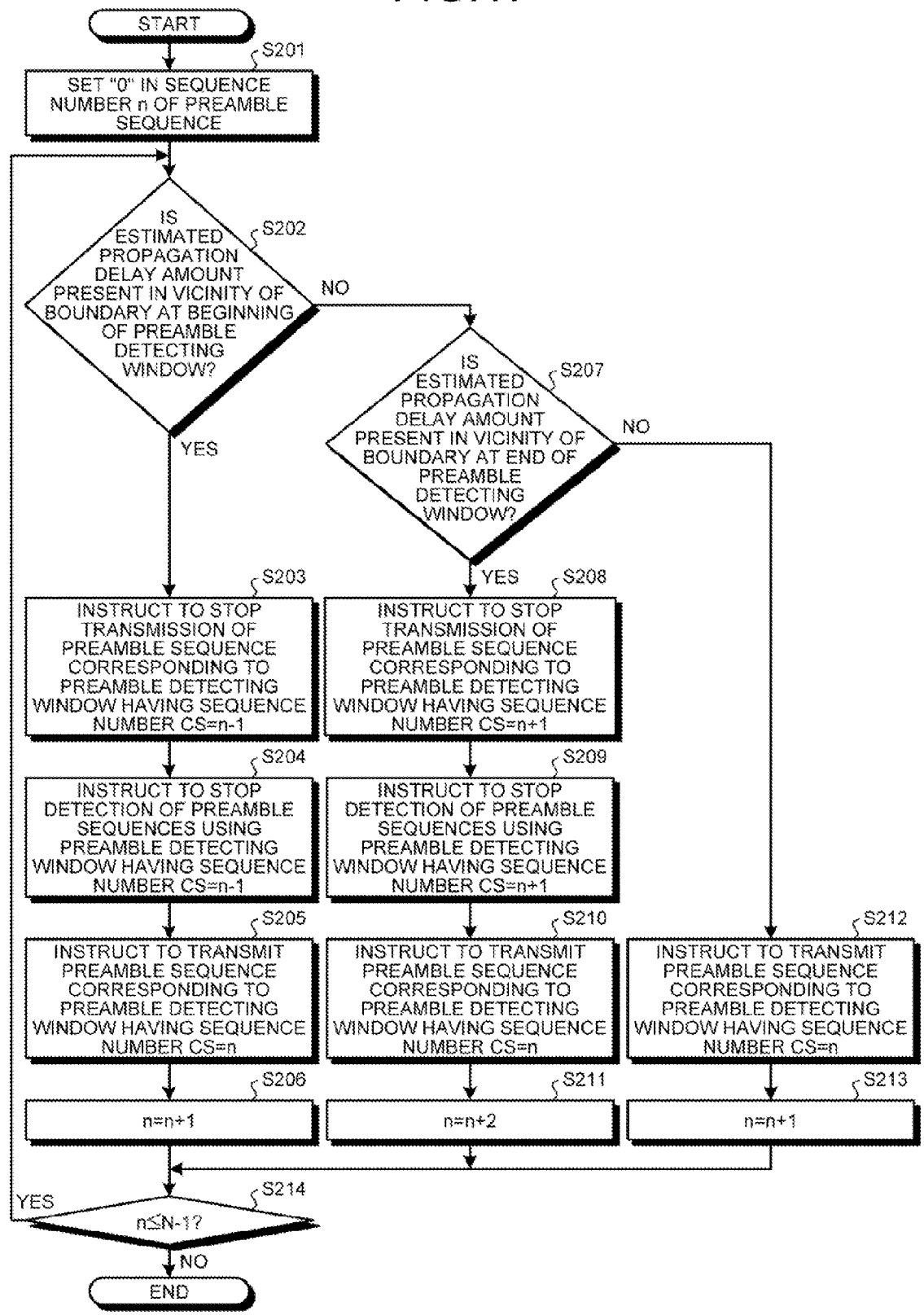
FIG. 17 is a flowchart for explaining the sequence of operations during a preamble sequence transmission instructing operation according to the present embodiment.

FIG. 17 is a flowchart for explaining the sequence of operations during the preamble sequence transmission instructing operation. As illustrated in FIG. 17, firstly, the sequence transmission instructing unit 134 sets "0" in a parameter n representing the sequence number CS of a preamble sequence (Step S201).

When the estimated propagation delay amount is present in the vicinity of the boundary at the beginning of that preamble detecting window (Yes at Step S202), the sequence transmission instructing unit 134 instructs the UE 10 to stop the transmission of the preamble sequence corresponding to the preamble detecting window having the sequence number CS=n−1 (Step S203). Moreover, the sequence transmission instructing unit 134 instructs the preamble sequence detecting unit 135 to stop the detection of preamble sequences using the preamble detecting window having the sequence number CS=n−1 (Step S204). Meanwhile, the sequence number CS=−1 corresponds to the sequence number N−1. Furthermore, the sequence transmission instructing unit 134 instructs the UE 10 to transmit the preamble sequence corresponding to the preamble detecting window having the sequence number CS=n (Step S205). That is, when the estimated propagation delay amount is present in the vicinity of the boundary at the beginning of a preamble detecting window, the sequence transmission instructing unit 134 instructs the UE 10 to stop the transmission of the preamble sequence corresponding to the preamble detecting window which lies adjacent across the boundary at the beginning of the preamble detecting window under consideration. Subsequently, the sequence transmission instructing unit 134 increments the parameter n by 1 (Step S206) and the system control proceeds to Step S214.

On the other hand, when the estimated propagation delay amount is present in the vicinity of the boundary at the end of that preamble detecting window (No at Step S202, Yes at Step S207), the sequence transmission instructing unit 134 instructs the UE 10 to stop the transmission of the preamble sequence corresponding to the preamble detecting window having the sequence number CS=n+1 (Step S208). Moreover, the sequence transmission instructing unit 134 instructs the preamble sequence detecting unit 135 to stop the detection of the preamble sequence using the preamble detecting window having the sequence number CS=n+1 (Step S209). Furthermore, the sequence transmission instructing unit 134 instructs the UE 10 to transmit the preamble sequence corresponding to the preamble detecting window having the sequence number CS=n (Step S210). That is, when the estimated propagation delay amount is present in the vicinity of the boundary at the end of a preamble detecting window, the sequence transmission instructing unit 134 instructs the UE 10 to stop the transmission of preamble sequences corresponding to the preamble detecting window which lies adjacent across the boundary at the end of the preamble detecting window under consideration. Subsequently, the sequence transmission instructing unit 134 increments the parameter n by 2 (Step S211) and the system control proceeds to Step S214.

Meanwhile, if the estimated propagation delay amount is neither present in the vicinity of the boundary at the beginning of a preamble detecting window nor present in the vicinity of the boundary at the end of the preamble detecting window (No at Step S207), then it means that no such preamble detecting window is present in which a side lobe of the delay profile may have leaked. Hence, the sequence transmission instructing unit 134 instructs the UE 10 to transmit the preamble sequence corresponding to the preamble detecting window having the sequence number CS=n (Step S212). Subsequently, the sequence transmission instructing unit 134 increments the parameter n by 1 (Step S213) and the system control proceeds to Step S214.

As long as the parameter n is equal to or smaller than the maximum sequence number N−1 (Yes at Step S214), the system control returns to Step S202. Once the parameter n exceeds the maximum sequence number N−1 (No at Step S214), the preamble sequence transmission instructing operation is completed.

As described above, when the estimated propagation delay amount is present in the vicinity of the boundary of a preamble detecting window, the eNB 100 according to the present embodiment instructs the UE 10 to stop the transmission of the preamble sequence corresponding to the preamble detecting windows which lies adjacent across the boundary of the preamble detecting window under consideration. Herein, the fact that the estimated propagation delay amount is present in the vicinity of the boundary of a preamble detecting window indicates that the UE 10 is present either in the vicinity of the eNB 100 or at the end portion of the cell housed in the eNB 100. In the case when the UE 10 is present either in the vicinity of the eNB 100 or at the end portion of the cell housed in the eNB 100, it becomes possible for the eNB 100 to avoid a situation of detecting a preamble sequence using a preamble detecting window in which a side lobe of the delay profile has leaked. As a result, false detection of the preamble signals is avoided when the mobile device is present either in the vicinity of the eNB 100 or at the end portion of the cell housed in the eNB 100.

Moreover, when the estimated propagation delay amount is present in the vicinity of the boundary of a preamble detecting window, the eNB 100 according to the present embodiment instructs the preamble sequence detecting unit 135 to stop the detection of the preamble sequence using the preamble detecting window which lies adjacent across the boundary of the preamble detecting window under consideration. That makes it possible to skip the operation of detecting the preamble sequence using such a preamble detecting window in which a side lobe of the delay profile has leaked. As a result, false detection of the preamble signals can be avoided in a reliable manner.

According to an aspect of the present invention, false detection of the preamble signals can be avoided in the case when a mobile device is present either in the vicinity of a base station or at the end portion of a cell.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
an obtaining unit that obtains, from another base station that communicates with a mobile device, a propagation delay amount between the other base station and the mobile device; and
an instructing unit that, when a propagation delay amount between the base station and the mobile device which is based on the propagation delay amount obtained by the obtaining unit is present within a predetermined range along a forward direction of a time axis from a boundary at the beginning of a detecting window that is used in detecting a preamble sequence transmitted from the mobile device, instructs the mobile device to stop the transmission of the preamble sequence corresponding to another detecting window which lies, in a backward direction of the time axis, adjacent across the boundary at the beginning of the detecting window and that, when the propagation delay amount is present within the predetermined range along the backward direction of the time axis from a boundary at the end of the detecting window, instructs the mobile device to stop the transmission of the preamble sequence corresponding to another detecting window which lies, in the forward direction of the time axis, adjacent across the boundary at the end of the detecting window.

2. The base station according to claim 1, further comprising:
an estimating unit that estimates the propagation delay amount between the base station and the mobile device based on the propagation delay amount obtained by the obtaining unit; and
a determining unit that determines whether or not an estimated propagation delay amount that is the propagation delay amount estimated by the estimating unit is present within a predetermined range from the boundary of the detecting window that is used in detecting a preamble sequence transmitted from the mobile device, wherein
when the determining unit determines that the estimated propagation delay amount is present within the predetermined range from the boundary of the detecting window, the instructing unit instructs the mobile device to stop the transmission of the preamble sequence corresponding to the other detecting window which lies adjacent across the boundary.

3. The base station according to claim 1, further comprising a detecting unit that detects a preamble sequence, which is transmitted from the mobile device, using the detecting window, wherein
apart from instructing the mobile device to stop the transmission of the preamble sequence corresponding to the other detecting window, the instructing unit instructs the detecting unit to stop the detection of a preamble sequence using the other detecting window.

4. The base station according to claim 2, wherein, the estimating unit estimates the propagation delay amount between the base station and the mobile device by calculating a tentative propagation delay amount by subtracting the propagation delay amount obtained by the obtaining unit from a propagation delay amount between the other base station and the base station and correcting the tentative propagation delay amount using a correction coefficient that is set in advance corresponding to overlapping sectors between the other base station and the base station.

5. A communication control method comprising:
obtaining, by a base station, from another base station that communicates with a mobile device, a propagation delay amount between the other base station and the mobile device;
transmitting, by the base station, when a propagation delay amount between the base station and the mobile device which is based on the propagation delay amount obtained at the obtaining is present within a predetermined range along a forward direction of a time axis from a boundary at the beginning of a detecting window that is used in detecting a preamble sequence transmitted from the mobile device,
a signal as an instruction to the mobile device to stop the transmission of the preamble sequence corresponding to another detecting window which lies, in a backward direction of the time axis, adjacent across the boundary at the beginning of the detecting window and transmitting, by the base station, when the propagation delay amount is present within the predetermined range along the backward direction of the time axis from a boundary at the end of the detecting window, a signal as an instruction to the mobile device to stop the transmission of the preamble sequence corresponding to another detecting window which lies, in the forward direction of the time axis, adjacent across the boundary at the end of the detecting window; and
receiving, by the mobile device, the signal that is transmitted by the base station as the instruction to stop the transmission of the preamble sequence.

6. A wireless communication system comprising:
a base station; and
a mobile device, wherein
the base station includes
an obtaining unit that obtains, from another base station that communicates with the mobile device, a propagation delay amount between the other base station and the mobile device; and
a wireless transceiving unit that, when a propagation delay amount between the base station and the mobile device which is based on the propagation delay amount obtained by the obtaining unit is present within a predetermined range along a forward direction of a time axis from a boundary at the beginning of a detecting window that is used in detecting a preamble sequence transmitted from the mobile device, transmits a signal as an instruction to the mobile device to stop the transmission of the preamble sequence corresponding to another detecting window which lies, in a backward direction of the time axis, adjacent across the boundary at the beginning of the detecting window and that, when the propagation delay amount is present within the predetermined range along the backward direction of the time axis from a boundary at the end of the detecting window, transmits a signal as an instruction to the mobile device to stop the transmission of the preamble sequence corresponding to another detecting window which lies, in the forward direction of the time axis, adjacent across the boundary at the end of the detecting window, and the mobile device includes a receiving unit that receives the signal that is transmitted by the base station as the instruction to stop the transmission of the preamble sequence.

7. A base station comprising:

a processor; and a memory, wherein the processor executes:

obtaining, from another base station that communicates with a mobile device, a propagation delay amount between the other base station and the mobile device;

instructing, when a propagation delay amount between the base station and the mobile device which is based on the propagation delay amount obtained at the obtaining is present within a predetermined range along a forward direction of a time axis from a boundary at the beginning of a detecting window that is used in detecting a preamble sequence transmitted from the mobile device, the mobile device to stop the transmission of the preamble sequence corresponding to another detecting window which lies, in a backward direction of the time axis, adjacent across the boundary at the beginning of the detecting window; and instructing, when the propagation delay amount is present within the predetermined range along the backward direction of the time axis from a boundary at the end of the detecting window, the mobile device to stop the transmission of the preamble sequence corresponding to another detecting window which lies, in the forward direction of the time axis, adjacent across the boundary at the end of the detecting window.

* * * * *